United States Patent Office 3,579,499
Patented May 18, 1971

3,579,499
AMINO ALKYL ESTERS OF 5β-PREGN-20-ENE-21-CARBOXYLIC ACIDS AND THE 3-GLYCOSIDES THEREOF
Richard Clarkson, Macclesfield, England, assignor to Imperial Chemical Industries Limited, London, England
No Drawing. Filed July 1, 1968, Ser. No. 741,241
Claims priority, application Great Britain, July 10, 1967, 31,671/67
Int. Cl. C07c 173/00
U.S. Cl. 260—210.5
5 Claims

ABSTRACT OF THE DISCLOSURE

The disclosure relates to aminoalkyl esters of 5β-pregn-20-ene-21-carboxylic acids, processes for their manufacture, pharmaceutical compositions containing them and a method of using them to increase the force of contraction of the heart of warm-blooded animals. Representative of the steroid derivatives disclosed is 2-dimethylaminoethyl 3β-14β-dihydroxy-5β-pregn-20-ene - 21 - carboxylate.

This invention relates to new steroidal compounds and more particularly it relates to new pregnene-21-carboxylic acid derivatives which possess digitalis-like activity.

According to the invention we provide new steroidal compounds of the formula:

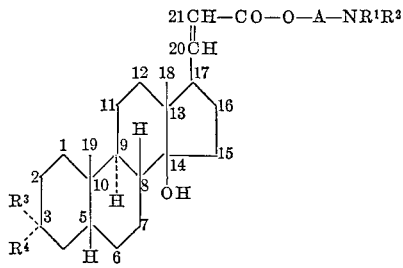

wherein $R^1$ and $R^2$, which may be the same or different, stand for alkyl radicals, or wherein $R^1$ and $R^2$ are joined, together with the adjacent nitrogen atom, to form a heterocyclic radical, wherein A stands for a straight- or branched-chain alkylene radical, wherein $R^3$ stands for hydrogen and $R^4$ stands for a hydroxy, glycosyloxy or acyloxy radical, or wherein $R^3$ and $R^4$ together with the adjacent carbon atom form the carbonyl (C=O) radical, and wherein the steroidal nucleus may optionally bear one or more additional oxygen-containing substituents selected from oxo, hydroxy, acyloxy and alkylenedioxy radicals, and wherein the steroidal nucleus may optionally contain one or more additional olefinic double-bond linkages, and the acid-addition salts thereof.

It is to be understood that in this specification the nomenclature of steroid derivatives used is in accordance with the International Union of Pure and Applied Chemistry 1957 Rules for Nomenclature of Steroids.

As a suitable value for $R^1$ or $R^2$ when it stands for an alkyl radical there may be mentioned, for example, an alkyl radical of up to 6 carbon atoms, for example the methyl or ethyl radical.

As a suitable value for the heterocyclic radical formed by $R^1$, $R^2$ and the adjacent nitrogen atom there may be mentioned, for example, a 5-, 6- or 7-membered heterocyclic radical, for example the pyrrolidino, piperidino or morpholino radical.

As a suitable value for the alkylene radical A there may be mentioned, for example, a straight- or branched-chain alkylene radical of at least 2 and up to 6 carbon atoms, for example the ethylene (—$CH_2CH_2$—), propylene (—$CH_2CH_2CH_2$—), $$\text{1-methylethylene} \begin{array}{c} CH_3 \\ | \\ (-CHCH_2-) \end{array} \text{ or 2-methylethylene} \begin{array}{c} CH_3 \\ | \\ (-CH_2CH-) \end{array} \text{ radical.}$$

As a suitable value for $R^4$ when it stands for a glycosyloxy radical there may be mentioned, for example, a hexosyloxy radical, for example the β-D-glucopyranosyloxy radical, or a 6-deoxyhexosyloxy radical, for example an L-rhamnosyloxy, D-fucosyloxy, L-talomethylosyloxy, D-gulomethylosyloxy or D-allomethylosyloxy radical, or a 2,6-bisdeoxyhexosyloxy radical, for example a D-digitoxosyloxy or D-boivinosyloxy radical, or a 3-O-methyl-6-deoxyhexosyloxy radical, for example a D- or L-thevetosyloxy, D-digitalosyloxy, L-acovenosyloxy or L-acofriosyloxy radical, or a 3-O-methyl-2,6-bisdeoxyhexosyloxy radical, for example a D-cymarosyloxy, D-sarmentosyloxy, D- or L-oleandrosyloxy or D- or L-diginosyloxy radical; or an oligosaccharyloxy radical derived from two or more of the glycosyloxy radicals, which may be the same or different, as defined above, particularly two or three such radicals, for example the O-β-D-digitoxosyl-(1→4)-O-β-D-digitoxosyl - (1→4) - β - D - digitoxosyloxy radical; or an acylated mono or oligosaccharyloxy radical, for example a mono- or oligosaccharyloxy radical as defined above which is acylated with one or more alkanoyl or aroyl radicals each of up to 10 carbon atoms such as acetyl, propionyl of benzoyl radicals, for example the 2,3,4-tri-O-acetyl-L-rhamnosyloxy, 4 - O - acetyl - β - D-cymarosyloxy, 4 - O -propionyl - β - D-cymarosyloxy or O - (3,4 - di - O - acetyl-β-D-digitoxosyl)-(1→4)-O-(3-O - acetyl - β - D - digitoxosyl)-(1→4)-(3-O-acetyl-β-D-digitoxosyloxy)- radical.

As a suitable value for $R^4$ when it stands for an acyloxy radical, or for the acyloxy radical which may be a substituent in the steroidal nucleus, there may be mentioned, for example, an alkanoyloxy or aroyloxy radical of up to 10 carbon atoms, for example the acetoxy, propionyloxy or benzoyloxy radical.

As a suitable alkylenedioxy radical which may be a substituent in the steroidal nucleus there may be mentioned, for example, an alkylenedioxy radical of up to 6 carbon atoms, for example the isopropyidenedioxy radical.

The additional hydroxy substituents in the steroidal nucleus may be present, for example, in one or more positions selected from the 1β, 5β, 6β, 7β, 8β, 11α, 11β, 12β, 16β and 19 positions. The additional acyloxy substituents in the steroidal nucleus may be present, for example, in one or more positions selected from the 1β, 6β, 7β, 11α, 11β, 12β, 16β and 19 positions. Additional oxo substituents in the steroidal nucleus may be present, for example, in one or more positions selected from the 11, 12, 16 and 19 positions. The additional alkylenedioxy substituents in the steroidal nucleus may link the 1β and 19 positions.

As suitable additional olefinic double-bond linkages which may be present in the steroidal nucleus there may be mentioned, for example, such linkages between carbon atoms 1 and 2; 4 and 5; 5 and 6; 9 and 11; and 11 and 12. The steroidal nucleus may bear, for example, one such additional linkage or it may bear, for example, two such linkages, for example between carbon atoms 1 and 2 and carbon atoms 4 and 5.

A particularly preferred group of steroidal compounds of the invention comprises compounds which have the same configurations of, and oxygen-containing substituents and olefinic double-bond linkages in, the steroidal nucleus from carbon atoms 1 to 19 as are present in the naturally-occurring cardenolides and bufadienolides, especially digitoxin, digitoxigenin, digoxin, digoxigenin, periplogenin, scillarenin, cymarol, strophanthidol, ouabain and ouabagenin and the moro- or poly-O-acetyl, O-propionyl and O-benzoyl derivatives thereof.

As suitable acid-addition salts of the steroidal compounds of the invention there may be mentioned, for example, acid-addition salts derived from inorganic acids, for example hydrochlorides, hydrobromides, phosphates or sulphates, or derived from organic acids, for example acetates, oxalates, citrates, lactates, tartrates, benzoates or salicylates.

Particular new steroidal compounds of the invention are the 2-dimethylaminoethyl esters of 3β,14β-dihydroxy-5β-pregn-20-ene-21-carboxylic acid;
3β,5β,14β-trihydroxypregn-20-ene-21-carboxylic acid;
3β,14β-dihydroxypregn-4,20-diene-21-carboxylic acid;
3β,12β,14β-trihydroxy-5β-pregn-20-ene-21-carboxylic acid;
3β-acetoxy-14β-hydroxy-5β-pregn-20-ene-21-carboxylic acid;
3β,12β-diacetoxy-14β-hydroxy-5β-pregn-20-ene-21-carboxylic acid;
3β,19β-diacetoxy-5β,14β-dihydroxypregn-20-ene-21-carboxylic acid;
3β,11α-diacetoxy-5β,14β-dihydroxy-1β,19-isopropylidenedioxypregn-20-ene-21-carboxylic acid;
1β,3β,11α,19-tetra-acetoxy-5β,14β-dihydroxypregn-20-ene-21-carboxylic acid;
1β,11α,19-triacetoxy-5β,14β-dihydroxy-3β-(2,3,4,-tri-O-acetyl-L-rhamnosyloxy)pregn-20-ene-21-carboxylic acid;
3β-benzoyloxy-14β-hydroxy-5β-pregn-20-ene-21-carboxylic acid;
3β,12β-dibenzoyloxy-14β-hydroxy-5β-pregn-20-ene-21-carboxylic acid;
3β-[O-(3,4-di-O-acetyl-β-D-digitoxosyl)-(1→4)-O-(3-O-acetyl-β-D-digitoxosyl)-(1→4)-(3-O-acetyl-β-D-digitoxosyl)]-14β-hydroxy-5β-pregn-20-ene-21-carboxylic acid;
12β-acetoxy-3β-[O-(3,4-di-O-acetyl-β-D-digitoxosyl)-(1→4)-O-(3-O-acetyl-β-D-digitoxosyl)-(1→4)-(3-O-acetyl-β-D-digitoxosyl)]-14β-hydroxy-5β-pregn-20-ene-21-carboxylic acid;
19-acetoxy-3β-(4-O-acetyl-β-D-cymarosyloxy)-5β,14β-dihydroxypregn-20-ene-21-carboxylic acid;
5β,14β-dihydroxy-3β-(4-O-propionyl-β-D-cymarosyloxy)-19-propionyloxy-pregn-20-ene-21-carboxylic acid;
3β-acetoxy-5β,14β-dihydroxypregn-20-ene-21-carboxylic acid; and
14β-hydroxy-3-oxo-5β-pregn-20-ene-21-carboxylic acid;

and the acid-addition salts thereof, particularly the citrate and oxalate salts thereof.

According to a further feature of the invention we provide a process for the manufacture of the steroidal compounds of the invention which comprises the interaction of a 17β-formylandrostane derivative of the formula:

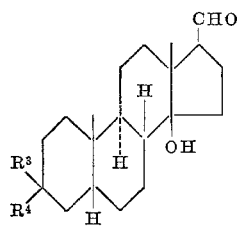

wherein $R^3$ and $R^4$ have the meanings stated above and wherein the steroidal nucleus may optionally contain one or more additional oxygen-containing substituents and/or olefinic double-bond linkages as defined above, with a phosphonate derivative of the formula:

wherein $R^1$, $R^2$ and A have the meanings stated above and wherein $R^5$ stands for an alkyl radical, in the presence of a strong base; whereafter if desired the substituents on or double-bond linkages in the steroidal nucleus may be modified by conventional means; and whereafter if desired the product in free base form may be converted into an acid-addition salt thereof by interaction with an acid.

As a suitable value for $R^5$ there may be mentioned, for example, an alkyl radical of up to 6 carbon atoms, for example the ethyl radical.

The interaction may be carried out in an inert diluent or solvent, for example 1,2-dimethoxyethane, diethylene glycol dimethyl ether, tetrahydrofuran, dimethylformamide or dimethylsulphoxide, and it may be carried out at ambient temperature. The strong base may be, for example, a metal hydride, for example sodium hydride, or a metal alkoxide, for example sodium ethoxide or potassium t-butoxide, or it may be a metal amide, for example sodamide.

The phosphonate derivative used as starting material may be obtained by the interaction of an alcohol of the formula HO—A—NR$^1$R$^2$, wherein $R^1$, $R^2$ and A have the meanings stated above, with a phosphonate derivative of the formula:

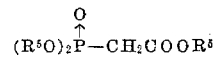

wherein $R^5$ has the meaning stated above.

The 17β-formylandrostane derivative used as starting material may be obtained by the interaction of the corresponding cardenolide with, successively, ozonised oxygen; a mold hydrolytic agent; lithium aluminum hydride or sodium borohydride; and an alkali metal periodate, for example sodium periodate, according to the following reaction scheme (ring D only of the steroidal nucleus being shown):

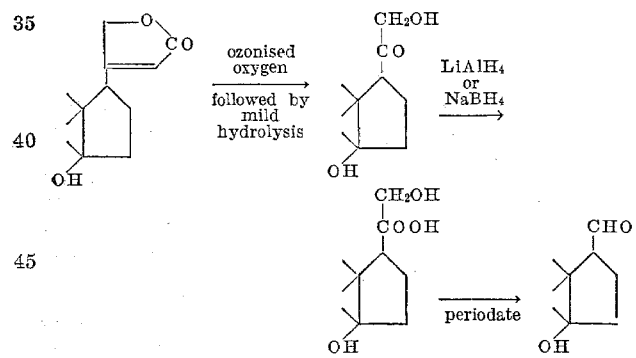

Alternatively, the corresponding bufadienolide may be used as starting material, or any appropriately-substituted pregnane-14β,20-21-triol, obtained by known or conventional means, may be oxidised with an alkali metal periodate according to the last stage of the abovementioned reaction scheme.

It is to be understood that if an oxo or acyloxy substituent is desired in the steroidal compound of the invention, this group must be introduced at a stage subsequent to any reaction involving lithium aluminium hydride or, in the case of an oxo group, sodium borohydride; if hydroxy substituents are desired on adjacent carbon atoms of the steroidal nucleus, or if a hydroxy and an oxo substituent are desired on adjacent carbon atoms of the steroidal nucleus, in the steroidal compound of the invention, such groups must be introduced at a stage subsequent to any reaction involving an alkali metal periodate or must suitably be protected during use of an alkali metal periodate; and if additional olefinic double-bonds are desired in the steroidal compound of the invention, such double-bonds must be introduced at a stage subsequent to any reaction involving ozone.

As stated above, the new steroidal compounds of the invention possess digitalis-like activity, having positive inotropic, negative chronotropic and negative dromotropic effects on the myocardium. They are useful, therefore, in the clinical management of heart diseases, for example congestive heart failure and artrial arrhythmias.

According to a further feature of the invention, therefore, we provide pharmaceutical compositions which comprise one or more of the steroidal compounds of the invention, or a salt thereof, in association with a pharmaceutically-acceptable diluent or carrier therefor.

The said pharmaceutical compositions may be in the form of tablets, capsules, aqueous or oily solutions or suspensions, emulsions, sterile injectable aqueous or oily solutions or suspensions, or dispersible powders.

The pharmaceutical compositions of the invention may additionally contain one or more drugs selected from $\beta$-adrenergic blocking agents, for example propranolol; other cardiotonic agents, for example digoxin, digitalis preparations, digitoxin and lanatoside C; diuretics, for example frusemide and ethacrynic acid, and thiazide diuretics, for example hydrochlorothiazide and bendrofluazide, and aldosterone antagonists, for example, spironolactone; coronary vasodilators, for example nitrite and nitrate esters, for example glyceryl trinitrate, pentaerythritol tetranitrate and sorbide nitrate, xanthine derivatives, for example theophylline, theobromine and aminophylline, and dipyridamole; and potassium preparations, for example potassium chloride and potassium gluconate.

It is expected that the steroid derivatives of the invention will be administered orally or parenterally, initially in the range of 0.1 to 5 mg. per patient per day, this dose subsequently being reduced as necessary.

The invention is illustrated but not limited by the following examples in which the parts are by weight:

EXAMPLE 1

0.144 part of a 50% dispersion of sodium hydride in oil is added to a solution of 0.88 part of diethyl 2-dimethylaminoethoxycarbonylmethylphosphonate in 20 parts of 1,2-dimethoxyethane. The mixture is stirred at ambient temperature for 10 minutes, 0.32 part of $17\beta$-formyl-$5\beta$-androstane-$3\beta$,$14\beta$-diol is added and the mixture is stirred at ambient temperature for 30 minutes. 100 parts of water are added and the mixture is extracted with ether. The etheral solution is extracted three times wih 30 parts of 0.1 molar aqueous oxalic acid solution each time and the combined aqueous extracts are basified with 10% sodium carbonate solution. The mixture is extracted with ether and the ethereal extract is dried over magnesium sulphate, and to it is added excess of a saturated solution of citric acid in ether. The mixture is centrifuged and the solid is separated, washed with ether and dried under reduced pressure. There is thus obtained 2-dimethylaminoethyl $3\beta$,$14\beta$ - dihydroxy-$5\beta$-pregn-20-ene-21-carboxylate as the hygroscopic citrate salt, which is characterised by an $R_F$ value of 0.3 when examined by thin-layer chromatography on silica gel plates using a mixture of benzene (90% v./v.) and triethylamine (10% v./v.) as developing solvent.

The $17\beta$-formyl-$5\beta$-androstane-$3\beta$,$14\beta$-diol used as starting material may be obtained as follows:

Ozonised oxygen is passed into a solution of 1.25 parts of 3-O-acetyldigitoxigenin in 120 parts of ethyl acetate which is maintained at $-70°$ C. The solution becomes blue in colour after approximately one hour and the passage of ozonised oxygen is continued for a further one hour. Oxygen is then passed through the mixture in order to remove the excess of ozone, and the solution is allowed to warm up to ambient temperature and is then evaporated to dryness at $25°$ C. under reduced pressure. The residue is dissolved in 40 parts of tetrahydrofuran, and the resulting solution is added dropwise to a stirred suspension of 0.60 part of lithium aluminium hydride in 30 parts of tetrahydrofuran which is maintained at ambient temperature in an atmosphere of nitrogen. The mixture is stirred under nitrogen at ambient temperature for one hour and is then heated under reflux for 30 minutes. The mixture is cooled, 1 part of water is cautiously added, and aqueous N-hydrochloric acid is then added until the pH of the mixture is approximately 1. 200 parts of water are added and the mixture is extracted three times with 50 parts of methylene chloride each time. The combined methylene chloride extracts are washed with water, dried and evaporated to dryness, and the residue is crystallised from aqueous methanol. There is thus obtained 5-pregnane-$3\beta$,$14\beta$,$20\xi$,21-tetraol, M.P. 154–172° C.

A solution of 0.215 part of sodium periodate in 4 parts of water is added to a solution of 0.352 part of the above tetraol in 10 parts of methanol. The solution is stirred at ambient temperature for 30 minutes and is then added to 50 parts of water, and the resulting mixture is extracted three times with 20 parts of chloroform each time. The combined chloroform extracts are washed with water and filtered and the filtrate is evaporated to dryness. There is thus obtained $17\beta$-formyl-$5\beta$-androstane-$3\beta$,$14\beta$-diol as an oil, which is characterised by an $R_F$ value of 0.8 when examined by thin-layer chromatography on silica gel plates using a 2% v./v. solution of methanol in ethyl acetate as the developing solvent, and also by proton magnetic resonance spectral bands at $\tau=9.06$ (singlet, three protons); 8.98 (singlet, three protons) and 0.28 (doublet, one proton).

The diethyl 2 - dimethylaminoethoxycarbonylmethylphosphonate used as a reagent in the above process is prepared as follows:

A solution of 22.4 parts of triethyl phosphonoacetate, 9.79 parts of N,N-dimethylaminoethanol and 0.24 part of a 50% dispersion of sodium hydride in oil in 100 parts of cyclohexane is slowly distilled through an efficient fractionation column under an atmosphere of nitrogen. When the column-head temperature has risen to $80°$ C. (after about 1½ hours), 0.98 part of N,N-dimethylaminoethanol and 0.24 part of a 50% dispersion of sodium hydride in oil are added to the reaction mixture. This causes the column-head temperature to fall as further quantities of the cyclohexane/ethanol azeotrope distill over. When the column-head temperature has again risen to $80°$ C. (after about 2 hours) still further amounts of N,N-dimethylaminoethanol and a 50% dispersion of sodium hydride in oil are added, and the distillation is continued for a further 30 minutes. Throughout the reaction cyclohexane is added to the reaction mixture to keep the volume of the reaction mixture constant. The solvent is evaporated from the residue in the distillation vessel and the residue is distilled.. There is thus obtained diethyl 2 - dimethylaminoethoxycarbonylmethylphosphonate, B.P. 119–123° C./0.35 mm.

EXAMPLE 2

The process described in Example 1 is repeated except that a molar equivalent of $17\beta$-formylandrostane-$3\beta$,$5\beta$,$14\beta$-triol is used as starting material in place of the $17\beta$-formyl-$5\beta$-androstane-$3\beta$,$14\beta$-diol. There is thus obtained 2-dimethylaminoethyl-$3\beta$,$5\beta$,$15\beta$ - trihydroxypregn - 20-ene-21 carboxylate as the hygoscopic citrate salt, which is characterised by an $R_F$ value of 0.1 when examined by thin-layer chromatography using the system described in Example 1.

The $17\beta$ - formylandrostane - $3\beta$,$5\beta$,$14\beta$-triol used as starting material may be obtained as follows:

A solution of 0.364 part of $4\beta$,$5\beta$:$14\beta$,$15\beta$-bisepoxypregnane-$3\beta$,$20\xi$,21-triol (Deghengi et alia, Tetrahedron Letters 1963, 2045) in 20 parts of tetrahydrofuran is added to a stirred suspension of 0.40 part of lithium aluminum hydride in 10 parts of tetrahydrofuran. The mixture is heated under reflux in an atmosphere of nitrogen for 4 hours and then cooled, and water is cautiously added. The tetrahydrofuran is removed by evaporation under reduced pressure and the residue is continuously extracted with methylene chloride during 18 hours. The methylene chloride extract is dried and evaporated to dryness and the residue is crystallised from a mixture of ethanol and ether. There is thus obtained pregnane-3β,5β,14β,20ξ,21-pentaol, M.P. 232–244° C.

The above pentaol is treated with aqueous sodium periodate solution by the process described in Example 1, and there is thus obtained 17β-formyl-androstane-3β,5β,14β-triol, M.P. 190–198° C. (crystallised from ethanol).

EXAMPLE 3

The process described in Example 1 is repeated except that a molar equivalent of 16β-formylandrost-4-ene-3β,14β-diol is used as starting material in place of the 17β-formyl-5β-androstane-3β,14β-diol. There is thus obtained 2-dimethylaminoethyl 3β,14β-dihydroxypregna - 4,20-diene-21-carboxylate as the hygroscopic citrate salt, which is characterised by an $R_F$ value of 0.2 when examined by thin-layer chromatography using the system described in Example 1.

The 17β-formylandrost-4-ene-3β,14β-diol used as starting material may be obtained as follows:

0.456 part of N-bromoacetamide is added to a mixture of 1.1 parts of 21-acetoxypregna-4,14-diene-3,20-dione (Meyer and Reichstein, Helvetica Chimica Acta, 1947, 30, 1508), 30 parts of peroxide-free dioxane, 3 parts of water and 0.25 part of 60% aqueous perchloric acid, and the solution is stirred at 10–15° C. for 35 minutes. Sodium sulphite is added in order to decompose the excess N-bromoacetamide, and 150 parts of ice-water are added. The mixture is filtered and the solid is dried and crystallised from ethyl acetate. There is thus obtained 21-acetoxy - 14α-bromo - 15-βhydroxypregn-4-ene - 3,20-dione-mono-hydrate, M.P. 82–90° C. (with decomposition).

A solution of 1.4 parts of the above bromohydrin in 50 parts of dry t-butanol containing 0.398 part of potassium 1-butoxide is stirred for 2 hours at ambient temperature. 500 parts of water are added and the mixture is extracted three times with 75 parts of chloroform each time. The combined chloroform extracts are dried and evaporated to dryness and the residue is crystallised from ethyl acetate. There is thus obtained 21-acetoxy-14β,15β-epoxypregn-4-ene-3,20-dione, M.P. 210–216° C.

A mixture of 0.79 part of the above epoxide, 0.76 part of lithium aluminum hydride and 40 parts of tetrahydrofuran is heated under reflux in an atmosphere of nitrogen for 18 hours. The mixture is cooled, 100 parts of water are cautiously added and the resulting suspension is extracted four times with 50 parts of methylene chloride each time. The combined methylene chloride extracts are dried and evaporated to dryness and the residue is stirred with ether. The mixture is filtered and there is thus obtained as solid residue pregn-4-en-3β,14β,20ξ,21-tetraol, which is characterised by an $R_F$ value of 0.2 when examined by thin-layer chromatography on silica gel plates using a 2% v./v. solution of methanol in ethyl acetate as developing solvent.

The above tetraol is treated with aqueous sodium periodate solution by the process described in Example 1, and there is thus obtained 17-formylandrost-4-en-3β,14β-diol, which is characterised by an $R_F$ value of 0.4 when examined by thin-layer chromatography on silica gel plates using a mixture of benzene (50% v./v.) and ethyl acetate (50% v./v.) as developing solvent, and also by proton magnetic resonance spectral bands at τ=8.97 (singlet, six protons); 4.76 (broad singlet, one proton) and 0.28 (doublet, one proton).

EXAMPLE 4

The process described in Example 1 is repeated except that a molar equivalent of 17β-formyl-5β-androstane-3β,12β,14β-triol is used as starting material in place of the 17β-formyl-5β-androstane-3β,14β-diol, and that oxalic acid is used in place of citric acid. There is thus obtained 2-dimethylaminoethyl 3β,12β,14β - trihydroxy-5β-pregn-20-ene-21-carboxylate as the hygroscopic oxalate salt, $[\alpha]_D^{23}=+26°$ (c.=1 in chloroform), which is also characterised by an $R_F$ value of 0.2 when examined by thin-layer chromatography using the system described in Example 1.

The 17β-formyl-5β-androstane-3β,12β,14β-diol used as starting material may be obtained as follows:

The process described in the second part of Example 1 is repeated except that a molar equivalent of 3,12-di-O-acetyldigitoxigenin is used as starting material in place of the 3-O-acetyldigitoxigenin. There is thus obtained 5β-pregnane-3β,12β,14β-20ξ,21-pentaol, M.P. 100–110° C. (with decomposition), $[\alpha]_D^{23}=+7°$ (c.=1 in methanol).

The above pentaol is oxidised with aqueous sodium periodate solution by a similar process to that described in the third part of Example 1, and there is thus obtained 17β-formyl - 5β - androstane-3β,12β,14β-triol as a gum, which is characterised by an $R_F$ value of 0.6 when examined by thin-layer chromatography in the system described in the third part of Example 1, and also by a proton magnetic resonance spectral band at τ=0.3 (doublet, one aldehydic proton), $[\alpha]_D^{23}=-60$ (c.=1 in methanol).

EXAMPLE 5

The process described in Example 1 is repeated except that a molar equivalent of 3β-acetoxy - 17β - formyl-5β-androstan-14β-ol is used as starting material in place of the 17β-formyl-5β-androstane-3β,14β-diol, and that oxalic acid is used in place of citric acid. There is thus obtained 2-dimethylaminoethyl 3β-acetoxy - 14β - hydroxy-5β-pregn-20-ene-21-carboxylate as the hygroscopic oxalate salt, $[\alpha]_D^{25}=+30°$ (c.=1 in chloroform), which is also characterised by an $R_F$ value of 0.3 when examined by thin-layer chromatography using the system described in Example 1.

The 3β - acetoxy-17β-formyl-5β-androstan-14β-ol used as starting material may be obtained as follows:

0.1 part of sodium borohydride is added to a solution of 0.5 part of 3β - acetoxy-14β,21-dihydroxy-5β-pregnan-20-one (Meyer and Reichstein, Helvetica Chimica Acta, 1947, 30, 1508) in 30 parts of absolute ethanol, and the solution is stirred at ambient temperature for 30 minutes. 100 parts of water are added and the mixture is extracted three times with 30 parts of chloroform each time. The combined chloroform extracts are dried and evaporated to dryness. There is thus obtained 3β - acetoxy-5β-pregnane-14β,20ξ,21-triol.

The above triol is oxidised with aqueous sodium periodate solution by a similar process to that described in the third part of Example 1 and there is thus obtained 3β - acetoxy-17β-formyl-5β-androstan14β-ol, M.P. 125–129° C. (crystallised from light petroleum, B.P. 60–80° C.), $[\alpha]_D^{23}=-20°$ (c.=1 in chloroform).

EXAMPLE 6

The process described in Example 1 is repeated except that a molar equivalent of 3β,12β-diacetoxy-17β-formyl-5β-androstan-14β-ol is used as starting material in place of 17β-formyl-5β-androstane-3β,14β-diol. There is thus obtained in 2 - dimethylaminoethyl 3β,12β-diacetoxy-14β-hydroxy-5β-pregn-20-ene-21-carboxylate as the hygroscopic citrate salt, $[\alpha]_D^{23}=+79°$ (c.=1 in chloroform), which is characterised by an $R_F$ value of 0.3 when examined by thin-layer chromatography using the system described in Example 1.

The 3β,12β - diacetoxy-17β-formyl-5β-androstan-14β-ol used as starting material may be obtained as follows:

3β,12β-diacetoxy - 14β,21 - dihydroxy-5β-pregnan-20-one (Pataki, Meyer and Reichstein, Helvetica Chimica Acta, 1953, 36, 1295) is reduced with sodium borohydride by a similar process to that described in the second part of Example 5, and there is thus obtained 3β,12β-diacetoxy - 5β - pregnane-14β,20ξ,21-triol, which is characterised by an $R_F$ value of 0.2 when examined by thin-layer chromatography on silica gel plates using ethyl acetate as developing solvent.

The above triol is oxidised with aqueous sodium periodate solution by a similar process to that described in the third part of Example 1, and there is thus obtained 3β,12β - diacetoxy-17β-formyl-5β,androstan-14β-ol which is characterised by an $R_F$ value of 0.6 when examined by thin-layer chromatography using the system described in the third part of Example 1, and also by proton magnetic resonance spectral bands at τ=9.04 (singlet, three protons); 8.94 (singlet, three protons) and 0.3 (doublet, one proton).

EXAMPLE 7

The process described in Example 1 is repeated except that a molar equivalent of 3β,19-diacetoxy-17β-formylandrostane-5β,14β-diol is used as starting material in place of the 17β - formyl-5β-androstane-3β,14β-diol. There is thus obtained 2-dimethylaminoethyl 3β,19-diacetoxy-5β, 14β - dihydroxypregn-20-ene-21-carboxylate as the hygroscopic citrate salt $[\alpha]_D^{23}=+49°$ (c.=1 in chloroform), which is also characterised by an $R_F$ value of 0.6 when examined by thin-layer chromatography on silica gel plates using a mixture of chloroform (90% v./v.) and trialkylamine (10% v./v.) as developing solvent.

The 3β,19-diacetoxy - 17β - formyl-androstane-5β,14β-diol used as starting material may be obtained as follows:

3β,19-diacetoxy - 5β,14β,21 - trihydroxypregnan-20-one (Oliveto et alia, Journal of the American Chemical Society, 1959, 81, 2831) is reduced with sodium borohydride by a similar process to that described in the second part of Example 5, and there is thus obtained 3β,19-diacetoxy-pregnane-5β,14β,20ξ, 21-tetraol.

The above tetraol is oxidised with aqueous sodium periodate solution by a similar process to that described in the third part of Example 1, and there is thus obtained 3β,19 - diacetoxy-17β-formylandrostane-5β,14β-diol as an oil, $[\alpha]_D^{23}=+18°$ (c.=1 in chloroform), which is also characterised by an $R_F$ value of 0.5 when examined by thin-layer chromatography on silica gel plates using a 5% v./v. solution of methanol in ethyl acetate as developing solvent, and also by proton magnetic resonance spectral bands at τ=8.98 (singlet, three protons) and 0.27 (doublet, one proton).

EXAMPLE 8

The process described in Example 1 is repeated except that a molar equivalent of 3β,11α-diacetoxy-17β-formyl-1β,19-isopropylidenedioxyandrostane-5β,14β-diol is used as starting material in place of the 17β-formyl-5β-androstane-3β,14β-diol, and that oxalic acid is used in place of citric acid. There is thus obtained 2-dimethylaminoethyl 3β,11α-diacetoxy - 5β,14β - dihydroxy - 1β,19 - isopropylidenedioxypregn-20-ene-21-carboxylate as the hygroscopic oxalate salt, $[\alpha]_D^{23}=+46°$) c.=1 in chloroform), which is also characterised by an $R_F$ value of 0.6 when examined by thin-layer chromatography using the system described in the first part of Example 7.

The 3β,11α-diacetoxy-17β-formyl-1β,19-isopropylidenedioxy-androstane-5β,14β-diol used as starting material may be obtained as follows:

3β,11α-diacetoxy - 5β,14β,21 - trihydroxy-1β,19-isopropylidenedioxypregnan-20-one (Tamm et alia, Helvetica Chimica Acta, 1957, 40, 1469) is reduced with sodium borohydride by a similar process to that described in the second part of Example 5, and there is thus obtained 3β,11α - diacetoxy - 1β,18 - isoproplidenedioxypregnane-5β,14β,20ξ,21-tetraol.

The above tetraol is oxidised with aqueous sodium periodate solution by a similar process to that described in the third part of Example 1 and there is thus obtained 3β,11α-diacetoxy-17β-formyl - 1β,19 - isopropylidenedioxyandrostane-5β,14β-diol which is characterised by an $R_F$ value of 0.5 when examined by thin-layer chromatography on silica gel plates using a 10% v./v. solution of methanol in ethyl acetate as the developing solvent, and also by proton magnetic resonance spectral bands at τ=8.85 (singlet, three protons), 8.75 (doublet, six protons) and 0.26 (doublet, one proton).

EXAMPLE 9

The process described in Example 1 is repeated except that a molar equivalent of 1β,3β,11α,19-tetra-acetoxy-17β-formylandrostane-5β,14β-diol is used as starting material in place of the 17β-formyl-5β-androstane-3β,14β-diol, and that oxalic acid is used in place of citric acid. There is thus obtained 2-dimethylaminoethyl 1β,3β,11α, 19-tetra-acetoxy-5β,14β-dihydroxypregn - 20 - ene-21-carboxylate as the hygroscopic oxalate salt, $[\alpha]_D^{23}=+12°$ (c.=1 in chloroform), which is also characterised by an $R_F$ value of 0.5 when examined by thin-layer chromatography using the system described in the first part of Example 7.

The 1β,3β,11α,19 - tetra-acetoxy-17β-formylandrostane-5β,14β-diol used as starting material may be obtained as follows:

1β,3β,11α,19-tetra-acetoxy - 5β,14β - dihydroxypregnan-20-one (Tamm et alia, Helvetica Chimica Acta, 1957, 40, 1469) is reduced with sodium borohydride by a similar process to that described in the second part of Example 5, and there is thus obtained 1β,3β,11α,19-tetra-acetoxypregnane-5β,14β,20ξ,21-tetraol.

The above tetraol is oxidised with aqueous sodium periodate solution by a similar process to that described in the third part of Example 1, and there is thus obtained 1β,3β,11α,19-tetra - acetoxy - 17β - formylandrostane-5β, 14β-diol as an oil which is characterised by an $R_F$ value of 0.8 when examined by thin-layer chromatography using the system described in the first part of Example 7, and also by proton magnetic resonance spectral bands at τ=8.87 (singlet, three protons) and 0.26 (doublet, one proton).

EXAMPLE 10

The process described in Example 1 is repeated except that a molar equivalent of 1β,11α,19-triacetoxy-17β-formyl 3β-(2,3,4-tri - O - acetyl-L-rhamnosyloxy)-androstane-5β,14β-diol is used as starting material in place of the 17β-formyl-5β-androstane-3β,14β-diol. There is thus obtained 2-dimethylaminoethyl 1β,11α,19-triacetoxy 5β,14β-dihydroxy - 3β(2,3,4 - tri - O - acetyl - L - rhamnosyloxy)-pregn-20-ene-21-carboxylate as the hygroscopic citrate salt, $[\alpha]_D^{23}=-36°$ (c.=1 in chloroform), which is also characterised by an $R_F$ value of 0.4 when examined by thin-layer chromatography using the system described in the first part of Example 7.

The 1β,11α,19-triacetoxy - 17β - formyl-3β-(2,3,4-tri-O-acetyl-L-rhamnosyloxy)androstane-5β,14β-diol used as starting material may be obtained as follows:

1β,11α,19-triacetoxy - 5β,14β,21 - trihydroxy-3β-(tri-O-acetyl - L - rhamnosyloxy)pregnan-20-one (Raffauf and Reichstein, Helvetica Chimica Acta, 1948, 31, 2111) is reduced with sodium borohydride by a similar process to that described in the second part of Example 5, and there is thus obtained 1β,11α,19-triacetoxy-3β-(2,3,4-tri-O-acetyl-L-rhamnosyloxy)pregnane-5β,14β,20ξ,21-tetraol.

The above tetraol is oxidised with aqueous sodium periodate solution by a similar process to that described in the third part of Example 1, and there is thus obtained 1β,11α,19-triacetoxy - 17β - formyl-3β-(2,3,4-tri-O-acetyl-L-rhamnosyloxy)androstane-5β,14β-diol as an oil which is characterised by proton magnetic resonance spectral bands at τ=8.85 (singlet, three protons), 8.77 (doublet, three protons) and 0.27 (doublet, one proton).

EXAMPLE 11

The process described in Example 1 is repeated except that a molar equivalent of 3β-benzyloxy-17β-formyl-5β-androstan-14β-ol is used as starting material in place of the 17β-formyl-5β-androstane-3β,14β-diol. There is thus obtained 2-dimethylaminoethyl 3β-benzoyloxy-14β-hydroxy-5β-pregn-20-ene-21-carboxylate as the hygroscopic citrate salt $[\alpha]_D^{23}=+34°$ (c.=1 in chloroform), which is also characterised by an $R_F$ value of 0.3 when examined by thin-layer chromatography using the system described in Example 1.

The 3β - benzoyloxy - 17β - formyl-5β-androstan-14β-ol used as starting material may be obtained as follows:

0.23 part of benzoyl chloride is added to a solution of 0.748 part of digitoxigenin in 3 parts of pyridine and the solution is stirred for 18 hours at ambient temperature and is then added to 50 parts of water. The mixture is filtered and the solid product is dried and crystallised from aqueous-methanol. There is thus obtained 3-O-benzoyl-digitoxigenin, M.P. 245–253° C. $[\alpha]_D^{23} = +23°$ (c.=1 in chloroform).

Ozonised oxygen is passed into a solution of 0.716 part of 3-O-benzoyldigitoxigenin and 0.12 part of water in 60 parts of methylene chloride which is maintained at −70° C. The solution becomes blue in colour and the passage of ozonised oxygen is continued for one further hour. Oxygen is passed through the mixture in order to remove the excess of ozone, and the solution is allowed to warm up to ambient temperature and is then washed with water, dried and evaporated to dryness. The residue is dissolved in 40 parts of ethanol, a solution of 1.2 parts of potassium bicarbonate in 6 parts of water is added and the mixture is stirred at ambient temperature for 30 mins. 100 parts of water are added and the mixture is extracted three times with chloroform. The combined chloroform extracts are washed with water and evaporated to dryness and the residue is crystallised from methanol. There is thus obtained 3β-benzoyloxy-14β,21-dihydroxy-5β-pregnan-20-one, M.P. 186–193° C. (with decomposition), $[\alpha]_D^{23} = +42°$ (c.=1 in chloroform).

The above ketol is reduced with sodium borohydride by a similar process to that described in the second part of Example 5 and there is thus obtained 3β-benzoyloxy-5β-pregnane-14β,20ξ,21-triol.

The above triol is treated with aqueous sodium periodate solution by a similar process to that described in the third part of Example 1, and there is thus obtained 3β-benzoyloxy - 17β - formyl - 5β - androstan-14β-ol hemihydrate, M.P. 192–195° C. (crystallised from ethanol), $[\alpha]_D^{23} = -8°$ (c.=1 in chloroform).

EXAMPLE 12

The process described in Example 1 is repeated except that a molar equivalent of 3β,12β-dibenzoyloxy-17β-formyl-5β-androstan-14β-ol is used as starting material in place of the 17β-formyl-5β-androstane-3β,14β-diol. There is thus obtained 2-dimethylaminoethyl 3β,12β-dibenzoyloxy - 14β - hydroxy - 5β - pregn-20-ene-21-carboxylate as the hygroscopic citrate salt $[\alpha]_D^{23} = +22°$ (c.=1 in chloroform) which is also characterised by an $R_F$ value of 0.2 when examined by thin-layer chromatography using the system described in Example 1.

The 3β,12β - dibenzoyloxy - 17β - formyl-5β-androstan-14β-ol used as starting material may be obtained as follows:

2 parts of benzoyl chloride are added to a solution of 1.17 parts of digoxigenin in 15 parts of pyridine and the mixture is allowed to stand at ambient temperature for 3 days. 150 parts of water are added and the mixture is extracted three times with 50 parts of ether each time. The combined ethereal extracts are washed successively with aqueous 2 N hydrochloric acid, aqueous 10% w./v. sodium bicarbonate solution and finally with water, and are then dried and evaporated to dryness. The resdue is crystallised from aqueous acetone and there is thus obtained 3,12-di-O-benzoyldigoxigenin, M.P. 263–267° C., $[\alpha]_D^{23} = +17°$ (c.=1 in chloroform).

The above dibenzoate is treated successively with ozonised oxygen and aqueous potassium bicarbonate solution by a similar process to that described in the third part of Example 11. There is thus obtained 3β,12β-dibenzoyloxy-14β,21-dihydroxy-5β-pregnan-20-one which is characterised by an $R_F$ value of 0.7 when examined by thin-layer chromatography on silica gel plates using a mixture of benzene (50% v./v.) and ethyl acetate (50% v./v.) as developing solvent.

The above ketol is reduced with sodium borohydride by a similar process to that described in the second part of Example 5, and there is thus obtained 3β,12β-dibenzoyloxy-5β-pregnane-14β,20ξ,21-triol.

The above triol is oxidised with aqueous sodium periodate solution by a similar process to that described in the third part of Example 1, and there is thus obtained 3β,12β - dibenzoyloxy - 17β-formyl-5β-androstan-14β-ol which is characterised by an $R_F$ value of 0.7 when examined by thin-layer chromatography on silica gel plates using a mixture of benzene (50% v./v.) and ethyl acetate (50% v./v.) as developing solvent.

EXAMPLE 13

The process described in Example 1 is repeated except that a molar equivalent of 3β-[O-(3-,4-di-O-acetyl-β-D-digitoxosyl) - (1→4) - O - (3-O-acetyl-β-D-digitoxosyl)-(1→4) - (3 - O - acetyl - β - D - digitoxosyloxy)]-17β-formyl-5β-androstan-14β-ol is used as starting material in place of the 17β-formyl-5β-adrostane-3β,14β-diol, and that oxalic acid is used in place of citric acid. There is thus obtained 2-dimethylaminoethyl 3β-[O-(3,4-di-O-acetyl - β - D - digitoxosyl) - (1→4)-O-(3-O-acetyl-β-D-digitoxyosyl) - (1→) - (3 - O - acetyl - β-D-digitoxosyloxy)] - 14β - hydroxy - 5β - pregn-20-ene-21-carboxylate as the hygroscopic oxalate salt, $[\alpha]_D^{23} = +54°$ (c.=1 in chloroform),which is also characterised by an $R_F$ value of 0.15 when examined by thin-layer chromatography using the system described in Example 1.

The 3β - [O - (3,4 - di - O - acetyl-β-digitoxosyl)-(→4) - O - (3 - O - acetyl - β-D-digitoxosyl)-(1→4)-(3-O-acetyl - β - D - digitoxosyloxy)]17β-formyl-5β-androstan-14β-ol used as starting material may be obtained as follows:

Tetra-O-acetyldigitoxin is treated successively with ozonised oxygen and aqueous potassium bicarbonate solution by a similar process to that described in the third part of Example 11. There is thus obtained 3β-[O-(3,4-di - O - acetyl - β - D - digitoxosyl) - (1→4)-O-acetyl-β - D - digitoxosyl) - (1→4)-(3-O-acetyl-β-D-digitoxosyloxy)] - 14β,21 - dihydroxy-5β-pregnan-20-one as an amorphous solid, $[\alpha]_D^{23} = +61°$ (c.=1 in chloroform) which is also characterised by an $R_F$ value of 0.5 when examined by thin-layer chromatography using the system described in the third part of Example 12.

The above ketol is reduced with sodium borohydride by a similar process to that described in the second part of Example 5 and there is thus obtained 3β-[O-(3,4-di-O-acetyl - β - D - digitoxosyl)-(1→4)-O-(3-O-acetyl-β-D-digitoxosyl) - (1→4) - (3-O-acetyl-β-D-digitoxosyloxy)]-5β-pregnane-14β,20ξ,21-triol.

The above triol is oxidised with aqueous sodium periodate solution by a similar process to that described in the third part of Example 1, and there is thus obtained 3β - [O - (3,4 - di-O-acetyl-β-D-digitoxyosyl)-(1→4)-O-(3 - O-acetyl-β-D-digitoxosyl)-(1→4)-O-(3-O-acetyl-β-D-digitoxosyl) - (1→4) - (3-O-acetyl-β-D-digitoxosyloxy)]-17β-formyl-5β-androstan-14β-ol as an amorphous solid, $[\alpha]_D^{23} = 38°$ (c.=1 in chloroform), which is also characterised by an $R_F$ value of 0.5 when examined by thin-layer chromatography on silica gel plates using ethyl acetate as the developing solvent, and by a proton magnetic resonance spectral band at τ=0.3 (doublet, aldehydic proton).

EXAMPLE 14

The process described in Example 1 is repeated except that 12β - acetoxy-3β-[O-(3,4-di-O-acetyl-β-D-digitoxosyl) - (1→4)-O-(3-O-acetyl-β-D-digitoxosyl)-(1→4)-(3 - O - acetyl - β-D-digtoxosyloxy)]-17β-formyl-5β-androstan-14β-ol is used as starting material in place of the 17β - formyl - 5β - androstane - 3β,14β-diol, and that oxalic acid is used in place of citric acid. There is thus obtained 2 - dimethylaminoethyl 12β-acetoxy-3β-[O-(3,4- di - O - acetyl-β-D-digitoxosyl)-(1→4)-O-(3-O-acetyl-β-D-digitoxosyl) - (1→4) - (3-O-acetyl-β-D-digitoxosyloxy]-14β-hydroxy-5β-pregn-20-ene-21-carboxylate as the hygroscopic oxalate salt, $[\alpha]_D^{23} = +76°$ (c.=1 in chloroform), which is also characterised by an $R_F$ value of 0.3 when examined by thin-layer chromatography using the system described in the first part of Example 7.

The 12β - acetoxy - 3β-[O-(3,4-di-O-acetyl-β-D-digitoxosyl) - (1→4) - (3 - O-acetyl-β-D-digitoxosyl)-(1→4)-(3 - O - acetyl - β - D-digitoxosyloxy)]-17β-formyl-5β-androstan-14β-ol used as starting material may be obtained as follows:

A solution of 1 part of digoxin in a mixture of 8 parts of pyridine and 8 parts of acetic anhydride is kept at ambient temperature for 7 days and is then added to 200 parts of water. The mixture is filtered and the solid product is dried. There is thus obtained penta-O-acetyldigoxin which is characterised by an $R_F$ value of 0.6 when examined by thin-layer chromatography on silica gel plates using a 2% v./v. solution of methanol in ethylacetate as the developing solvent.

The above penta-acetate is treated successively with ozonized oxygen and aqueous potassium bicarbonate solution by a similar process to that described in the third part of Example 11, and there is thus obtained 12β-acetoxy-3β-[O - (3,4 - di-O-acetyl - β-D-digitoxosyl)-(1→4)-O-(3-O-acetyl - β - D-digitoxosyl)-(1→4)-(3-O-acetyl-β-D-digitoxosyloxy)]-14β,21-dihydroxy-5β-pregnan-20-one as an oil which is characterised by an $R_F$ value of 0.4 when examined by thin-layer chromatography using the system described in the third part of Example 12.

The above ketol is reduced with sodium borohydride by a similar process to that described in the third part of Example 1 and there is thus obtained 12β-acetoxy-3β-[O-(3,4-di-O-acetyl - βD - digitoxosyl)-(1→4)-O-(3-O-acetyl-β-D-digitoxosyl)-(1→4) - 3 - O - acetyl-β-D-digitoxosyloxy)]-17β-formyl-5β-androstan-14β-ol as an oil which is characterised by an $R_F$ value of 0.6 when examined by thin-layer chromatography on silica gel plates using a 2% v./v. solution of methanol in ethyl acetate as the developing solvent, and also by a proton magnetic resonance spectral band at $\tau=0.28$ (doublet, one proton).

EXAMPLE 15

The process described in Example 1 is repeated except that a molar equivalent of 19-acetoxy-3β-(4-O-acetyl-β-D-cymarosyloxy) - 17β - formylandrostane - 5β,14β-diol is used as starting material in place of the 17β-formyl-5β-androstane-3β,14β-diol. There is thus obtained 2-dimethylaminoethyl 19 - acetoxy - 3β-(4-O-acetyl-β-D-cymarosyloxy)-5β,14β-dihydroxypregn-20-ene-21-carboxylate as the hygroscopic citrate salt, $[\alpha]_D^{23}=+46°$ (c.=1 in chloroform), which is also characterised by an $R_F$ value of 0.2 when examined by thin-layer chromatography using the system described in Example 1.

The 19 - acetoxy - 3β - (4-O-acetyl-β-D-cymarosyloxy)-17β-formylandrostane-5β,14β-diol used as starting material may be obtained as follows:

4',19-di-O-acetylcymarol is treated successively with ozonised oxygen and aqueous potassium bicarbonate solution by a similar process to that described in the third part of Example 11. There is thus obtained 19-acetoxy-3β - (4 - O-acetyl-β-D-cymarosyloxy)-5β,14β-dihydroxypregnan-20-one as an oil which is characterised by an $R_F$ value of 0.3 when examined by thin-layer chromatography on silica gel plates using a 5% v./v. solution of methanol in ethyl acetate as the developing solvent.

The above ketol is reduced with sodium borohydride by a similar process to that described in the second part of Example 5, and there is thus obtained 19-acetoxy-3β-(4 - O-acetyl-β-D-cymarosyloxy)pregnane-5β,14β,20ξ,21-tetraol.

The above tetraol is oxidised with aqueous sodium periodate solution by a similar process to that described in the third part of Example 1, and there is thus obtained 19-acetoxy-3β - (4 - O - acetyl-β-D-cymarosyloxy)-17β-formylandrostane-5β,14β - diol as an amorphous solid, $[\alpha]_D^{23}=+17°$ (c.=1 in chloroform).

EXAMPLE 16

The process described in Example 1 is repeated except that a molar equivalent of 17β-formyl-3β-(4-O-propionyl-β-D-cymarosyloxy) - 19-propionyloxyandrostane-5β,14β-diol is used as starting material in place of the 17β-formyl-5β-androstane-3β,14β-diol. There is thus obtained 2-dimethylaminoethyl 5β,14β-dihydroxy-3β-(4-O-propionyl-β-D-cymarosyloxy) - 19 - propionyloxy-pregn-20-ene-21-carboxylate as the hygroscopic citrate salt, $[\alpha]_D^{23}=+38°$ (c.=1 in chloroform), which is also characterised by an $R_F$ value of 0.2 when examined by thin-layer chromatography using the system described in Example 1.

The 17β-formyl-3β-(4-O-propionyl-β-D-cymarosyloxy)-19-propionyloxyandrostane-5β,14β - diol used as starting material may be obtained by a similar process to that described in Example 15, except that 4',19-di-O-propionylcymarol is used in place of 4',19-di-O-acetylcymarol. One of the intermediates in this process, 5β,14β,21-trihydroxy-3β - (4 - O-propionyl-β-D-cymarosyloxy)-19-propionyloxypregnan-20-one, has $[\alpha]_D^{23}=+48°$ (c.=1 in chloroform).

EXAMPLE 17

A solution of 0.440 part of 2-dimethylaminoethyl-3β,5β,14β-trihydroxypregn-20-ene-21-carboxylate in a mixture of 10 parts of pyridine and 4 parts of acetic anhydride is kept for 24 hours at ambient temperature and is then heated at a temperature of 30° C. under reduced pressure in order to remove the pyridine by evaporation. The residue is dissolved in 10 parts of ethyl acetate and to the solution is added an excess of a saturated solution of oxalic acid in ethyl acetate. The mixture is filtered and there is thus obtained as solid product 2-dimethylaminoethyl 3β-acetoxy-5β,14β-dihydroxypregn - 20 - ene-21-carboxylate as the hygroscopic oxalate salt, $$[\alpha]_D^{23}=47°$$

(c.=1 in chloroform), which is also characterised by an $R_F$ value of 0.5 when examined by thin-layer chromatography using the system described in Example 1.

EXAMPLE 18

0.1 part of an aqueous 8 N-chromic acid solution is added to a solution of 0.14 part of a 2-dimethylaminoethyl 3β,14β - dihydroxy - 5β - pregn - 20 - ene - 21 - carboxylate in 5 parts of acetone (which has previously distilled from potassium permanganate) and the solution is stirred at 0° C. for 15 minutes and is then added to 50 parts of water. The mixture is made alkaline with aqueous 10% sodium carbonate solution and is then extracted three times with 30 parts of ether each time. The combined ethereal extracts are washed with water and then dried and to the solution is added an excess of a saturated ethereal solution of citric acid. The mixture is filtered and there is thus obtained as solid product 2-dimethylaminoethyl-14β-hydroxy-3-oxo - 5β - pregn - 20 - ene - 21 - carboxylate as the hygroscopic citrate salt, $[\alpha]_D^{23}=+40°$ (c.=1 in chloroform), which is also characterised by an $R_F$ value of 0.4 when examined by thin-layer chromatography using the system described in Example 1.

The positive inotropic activity, that is, the increase in the magnitude of cardiac contractile force, of a selection of the steroidal compounds of the invention was measured by one or both of the following experimental procedures which are standard in the art for the measurement of such activity:

(A) Guinea pig preparation

Guinea pigs were anaesthetised using urethane, 1.25 g./kg. body weight, administered intraperitoneally. The jugular vein of each animal was cannulated for administration of the compound under test, the trachea was cannulated and the animal was maintained on intermittent positive pressure artificial respiration. Lead II electrocardiogram (E.C.G.) was recorded. The heart was rendered accessible on the left side through an aperture between the 2nd and 5th ribs, ribs 3 and 4 being removed. The pericardium was slit, and a double lever system was sutured to the ventricular myocardium. One lever was fixed and served to anchor the heart; the other was connected to a strain gauge element to record isometric contractile force changes. Continuous records of contractile force and E.C.G. were made on a "Mingograph" ink-ejection machine, the efficacy of the recording system being checked in each animal by injecting 0.1 mg./kg. adrenaline into the jugular vein.

Compounds under test were then infused in solution in a mixture of 10% v./v. dimethylsulphoxide and 90% v./v. physiological saline solution at a constant rate of 0.5 ml./hour until cardiac arrhythmias developed. The following parameters were then measured:

(1) time taken from beginning of infusion to maximum increase in contractile force ($T_{Fm}$);
(2) time taken to cause development of arrhythmias ($T_A$);
(3) maximum increase in contractile force, expressed as a percentage of control contractile force ($\Delta_{Fm}$).

Because constant rate of infusion is used, the times are directly proportional to the total doses administered, and an indication of therapeutic ratio can be calculated as the ratio of $T_A$ to $T_{Fm}$, development of arrhythmias being taken as the indication of toxicity.

The results obtained with certain steroidal compounds of the invention were as follows:

TABLE I

| 2-dimethylaminoethyl-14β-hydroxy-5β-pregn-20-ene-21-carboxylate derivative | Rate of infusion (μg./kg./min.) | $T_{Fm}$ (min.) | $T_A$ (min.) | $T_A/T_{Fm}$ | $\Delta_{Fm}$ |
|---|---|---|---|---|---|
| 3β-hydroxy | 5 | 49 | 102 | 2.1 | 57 |
| 3β,5β-dihydroxy | 5 | 17 | 81 | 4.75 | 38 |
| 3β-hydroxy-Δ⁴ | 5 | 24 | 63 | 2.6 | 22 |
| 3β,12β-hydroxy | 5 | 47 | >294 | >6.25 | 53 |
| 3β-acetoxy | 5 | 60 | >300 | >5 | 53 |
| 3β,12β-diacetoxy | 5 | 20 | >150 | >7.5 | 60 |
| 3β-benzoyloxy | 5 | 150 | >285 | >1.9 | 43 |
| 3β o-(3,4-di-o-acetyl-D-digitoxosyl)-(1→4)-(3-o-acetyl-D-digitoxosyl)(1→4)-(3-o-acetyl-D-digitoxosyloxy) | 5 | 70 | >300 | >4.3 | 72 |
| Ouabain | 5 | 14 | 17 | 1.2 | 54 |
| Proscillaridin A | 5 | 47 | 82 | 1.74 | 46 |

B. Canine preparation

Dogs were anaesthetised using "Nembutal," 30 mg./kg. body weight, administered intravenously, supplemented by 1 ml./kg. body weight of a 6 mg./ml. solution of "Nembutal" in 0.9% physiological saline administered intraperitoneally. Lead II E.C.G. was recorded and blood pressure was determined by means of a 2 mm. bore catheter inserted into the left carotid artery. The trachea was intubated and the animal was maintained on intermittent positive pressure artificial respiration at constant volume, expiratory pressure being maintained constant at 4 cm. of water. The chest was opened on the right side by way of the fourth intercostal space, the pericardium was incised and a small strain-gauge arch was sutured under tension to the right ventricle. Small acrylic plaques bearing silver electrodes were sutured to the sino-atrial nodal region and to the ventricles in the region of the ventral interventricular cleft, in order to enable accurate determination of A–V conduction times. The heart rate was determined from the ventricular electrodes using a continuous recording cardiotachometer. All parameters were recorded on an 8 channel "Precision Instruments" tape recorder and were played back, either in real-time or in tenfold real-time, onto a "Mingograph" 81 ink-ejection recorder.

Compounds under test were then infused into a brachial vein in solution in a mixture of 10% v./v. dimethylsulphoxide and 90% v./v. physiological saline solution at a constant rate until cardiac arrhythmias, and then fibrillation, developed. The following parameters were measured:

(1) time taken from beginning of infusion to maximum increase in contractile force ($T_{Fm}$);
(2) time taken to cause development of arrhythmias ($T_A$);
(3) time taken to cause fibrillation, and hence death ($T_D$);
(4) maximum increase in contractile force, expressed as a percentage of control contractile force ($\Delta_{Fm}$).

Because constant rate of infusion is used, the times are directly proportional to the total doses administered, and an indication of therapeutic ratio can be calculated as the ratio of $T_A$ to $T_{Fm}$, development of arrhythmias being taken as the indication of toxicity.

The results obtained with certain steroidal compounds of the invention were as follows:

TABLE 2

| 2-dimethylaminoethyl-14β-hydroxy-5β-pregn-20-ene-21-carboxylate derivative | Rate of infusion (μg./kg./min.) | $T_{Fm}$ (min.) | $T_A$ (min.) | $T_D$ (min.) | $T_A/T_{FM}$ | $\Delta_{Fn}$ |
|---|---|---|---|---|---|---|
| 3β-hydroxy | 1 | 186 | 206 | 312 | 1.10 | 120 |
| 3β,12β-dihydroxy | 1 | 256 | 270 | 309 | 1.04 | 144 |
| 3β,12β-diacetoxy | 1 | 330 | >360 | >360 | >1.09 | 106 |
| Ouabain | 1 | 48 | 58 | 109 | 1.2 | 67 |
| Proscillaridin A | 1.25 | 90 | 92 | 144 | 1.0 | 113 |

Results for ouabain and proscillaridin A are given in Tables 1 and 2 above for purposes of comparison. It is clear from the abovementioned results that the steroidal compounds of the invention possess positive inotropic activity on the heart muscle of warm-blooded animals, and that the ratio between the dose which produces toxic symptoms (as demonstrated by the onset of cardiac arrythmias) and the effective dose is comparable with such a ratio as measured for standard cardiac glycosides.

It is recommended that, in the treatment of warm-blooded animals, including mammals, the steroidal compounds of the invention be administered orally, for example in tablet or capsule form, or parenterally, for example as a sterile injectable aqueous solution, at a total daily dose in the range of 10 μg. to 100 μg. per kg. of host. In particular, when used in the treatment of man, it is recommended that a total daily dose of between 0.5 mg. and 5 mg. per patient be used initially, the compound being administered at intervals, preferably 4 or 5 such intervals, during the day. It is expected that a lower dose than the initial dose will be used for maintenance therapy.

What I claim is:

1. A steroidal compound selected from the group consisting of compounds of the formula:

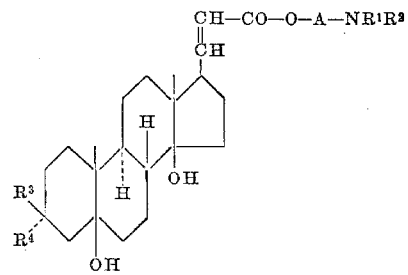

wherein $R^1$ and $R^2$, which may be the same or different, are alkyl of up to 6 carbon atoms, or $R^1$ and $R^2$ together with the adjacent nitrogen atom, are pyrrolidino, piperidino or morpholino; A is straight- or branched-chain alkylene of 2 to 6 carbon atoms; $R^3$ is hydrogen; and $R^4$ is hydroxy; hexosyloxy; 6 - deoxyhexosyloxy; 2,6 - bisdeoxyhexosyloxy; 3 - O - methyl - 6 - deoxyhexosyloxy; 3 - O - methyl - 2,6 - bisdeoxyhexosyloxy; di- or tri-saccharyloxy derived from respectively two or three of the abovementioned glycosyloxys; mono-, di- or trisaccharyloxy as defined above, acylated with 1 to 4 alkanoyl or aroyl substituents each of up to 10 carbon atoms; or alkanoyloxy or aroyloxy of up to 10 carbon atoms; or $R^3$ and $R^4$ together are oxo; compounds as defined above which additionally contain 1 to 4 substituents selected from hydroxy in positions $1\beta$, $5\beta$, $6\beta$, $7\beta$, $8\beta$, $11\alpha$, $11\beta$, $12\beta$, $16\beta$ and 19; oxo in positions 11, 12, 16 and 19; alkanoyloxy or aroyloxy of up to 10 carbon atoms in positions $1\beta$, $6\beta$, $7\beta$, $11\alpha$, $11\beta$, $12\beta$, $16\beta$ and 19; and $1\beta$, 19-alkylenedioxy of up to 6 carbon atoms; compounds as defined above which additionally contain one or two olefinic double-bonds in the positions 1, 2, 4, 5, 5, 6, 9, 11, or 11, 12; and the pharmaceutically-acceptable acid addition salts of the compounds defined above.

2. A steroidal compound according to claim 1 selected from: compounds wherein $R^1$ and $R^2$, which may be the same or different, are methyl or ethyl, or wherein $R^1$ and $R^2$ together with the adjacent nitrogen atom are pyrrolidino, piperidino or morpholino; wherein A is ethylene, propylene, 1-methylethylene or 2-methylethylene; wherein $R^3$ is hydrogen and $R^4$ is hydroxy, acetoxy, propionyloxy, benzoyloxy, $\beta$-D-glucopyranosyloxy; L-rhamnosyloxy, D-fucosyloxy, L-talomethylosyloxy, D-gluomethylosyloxy, D-allomethylosyloxy, D-digitoxosyloxy, D-boivinosyloxy, D- or L-thevetosyloxy, D-digitalosyloxy, L-acovenosyloxy, L-acofriosyloxy, D-cymarosyloxy, D-sarmentosyloxy, D- or L-oleandrosyloxy, D- or L-diginosyloxy, di- or tri-saccharyloxy radicals derived from respectively two or three of the abovementioned glycosyloxys, which may be the same or different, mono-, di- or tri-saccharyloxy as defined above which is acylated with 1 to 4 acetyl, propionyl or benzoyl substituents; or wherein $R^3$ and $R^4$ together are oxo; compounds which additionally contain 1 to 4 substituents selected from xoo, hydroxy, acetoxy, propionyloxy, benzoyloxy and isopropylidenedioxy substituents; compounds which additionally contain a 4,5-olefinic double bond; and the hydrochlorides, hydrobromides, phosphates, sulphates, acetates, oxalates, citrates, lactates, tartrates, benzoates and salicylates thereof.

3. A steroidal compound as claimed in claim 1 wherein carbon atoms 1 to 19 of the steroidal nucleus have the same configuration, oxygen-containing substituents and olefinic double-bonds as are present in digitoxin, digitoxigenin, digoxin, digoxigenin, periplogenin, scillarenin, symarol, strophanthidol, ouabain or ouabagenin or a mono- or poly-O-acetyl, O-propionyl or O-benzoyl derivative thereof.

4. A steroidal compound selected from the group consisting of 2-dimethylaminoethyl esters of $3\beta,14\beta$-dihydroxy-$5\beta$-pregn-20-ene-21-carboxylic acid;
$3\beta,5\beta,14\beta$-trihydroxypregn-20-ene-21-carboxylic acid;
$3,14\beta$-dihydroxy-pregn-4,20-diene-21-carboxylic acid;
$3\beta,12\beta,14\beta$-trihydroxy-$5\beta$-pregn-20-ene-21-carboxylic acid;
$3\beta$-acetoxy-$14\beta$-hydroxy-$5\beta$-pregn-20-ene-21-carboxylic
$3\beta,12\beta$-diacetoxy-$14\beta$-hydroxy-$5\beta$-pregn-20-ene-21 carboxylic acid;
$3\beta,19\beta$-diacetoxy-$5\beta,14\beta$-dihydroxypregn-20-ene-21-carboxylic acid;
$3\beta,11\alpha$-diacetoxy-$5\beta,14\beta$-dihydroxy-$1\beta,19$-isopropylidenedioxypregn-20-ene-21-carboxylic acid;
$1\beta,3\beta,11\alpha,19$-tetra-acetoxy-$5\beta,14\beta$-dihydroxypregn-20-ene-21-carboxylic acid;
$1\beta,11\alpha,19$-triacetoxy-$5\beta,14\beta$-dihydroxy-$3\beta$-(2,3,4-tri-O-acetyl-L-rhamnosyloxy)pregn-20-ene-21-carboxylic acid;
$3\beta$-benzoyloxy-$14\beta$-hydroxy-$5\beta$-pregn-20-ene-21-carboxylic acid;
$3\beta,12\beta$-dibenzoyloxy-$14\beta$-hydroxy-$5\beta$-pregn-20-ene-21-carboxylic acid;
$3\beta$-[O-(3,4-di-O-acetyl-$\beta$-D-digitoxosyl)(1→4)-O-(3-O-acetyl-$\beta$-O-digitoxosyl)-(-→4)-(3-O-acetyl-$\beta$-D-digitoxosyloxy)]-$14\beta$-hydroxy-$5\beta$-pregn-20-ene-21-carboxylic acid;
$12\beta$-acetoxy-$3\beta$-[O-(3,4-di-O-acetyl-$\beta$-D-digitoxosyl)-(1→4)-O-(3-O-acetyl-$\beta$-D-digitoxosyl)-(1→4)-O-(3O-acetyl-digitoxosyl)-(1→4)-(3-O-acetyl-$\beta$-D-digitoxosyloxy)]-$14\beta$-hydroxy-$5\beta$-pregn-20-ene-21-carboxylic acid;
19-acetoxy-$3\beta$-(4-O-acetyl-$\beta$-D-cymarosyloxy)-$5\beta,14\beta$-dihydroxypregn-20-ene-21-carboxylic acid;
$5\beta,14\beta$-dihydroxy-$3\beta$-(4-$\beta$-propionyl-$\beta$-D-cymarosyloxy)-19-propionyloxypregn-20-ene-21-carboxylic acid;
$3\beta$-acetoxy-$5\beta,14\beta$-dihydroxypregn-20-ene-carboxylic acid; and
$14\beta$-hydroxy-3-oxo-$5\beta$-pregn-20-ene-21-carboxylic acid; and the pharmaceutically-acceptable acid-addition salts thereof.

5. Pharmaceutically-acceptable acid addition salts as claimed in claim 4 which are citrates or oxalates.

References Cited
UNITED STATES PATENTS

| | | | |
|---|---|---|---|
| 3,036,061 | 5/1962 | MacPhillamy et al. | 260—210.5 |
| 3,198,792 | 8/1965 | Reerink et al. | 260—239.5 |

ELBERT L. ROBERTS, Primary Examiner

J. R. BROWN, Assistant Examiner

U.S. Cl. X.R.

260—239.5, 239.55, 397.1; 424—182, 241, 243